United States Patent
Garin

(10) Patent No.: US 9,042,548 B2
(45) Date of Patent: May 26, 2015

(54) SPS AUTHENTICATION

(71) Applicant: QUALCOMM Incorporated, San Diego, CA (US)

(72) Inventor: Lionel J. Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 13/679,820

(22) Filed: Nov. 16, 2012

(65) Prior Publication Data

US 2013/0127664 A1 May 23, 2013

Related U.S. Application Data

(60) Provisional application No. 61/561,824, filed on Nov. 18, 2011.

(51) Int. Cl.

| | |
|---|---|
| G06F 21/00 | (2013.01) |
| H04L 29/06 | (2006.01) |
| G01S 19/24 | (2010.01) |
| G06F 21/42 | (2013.01) |
| G06F 21/12 | (2013.01) |
| G01S 19/21 | (2010.01) |
| G01S 5/14 | (2006.01) |
| H04L 9/00 | (2006.01) |
| H04B 1/00 | (2006.01) |
| H04L 9/32 | (2006.01) |

(52) U.S. Cl.
CPC ............... *G01S 19/24* (2013.01); *H04L 9/3215* (2013.01); *G06F 21/42* (2013.01); *G06F 21/123* (2013.01); *G01S 19/215* (2013.01)

(58) Field of Classification Search
CPC ...... G06F 21/123; G06F 21/42; H04L 9/3215
USPC .......................... 380/258, 250, 230; 375/149
See application file for complete search history.

(56) References Cited

U.S. PATENT DOCUMENTS

| | | |
|---|---|---|
| 5,541,606 A | 7/1996 | Lennen |
| 5,576,715 A | 11/1996 | Litton et al. |
| 5,610,984 A | 3/1997 | Lennen |

(Continued)

FOREIGN PATENT DOCUMENTS

| | | | |
|---|---|---|---|
| JP | 2001166027 A | * | 6/2001 |
| WO | 2010105136 A2 | | 9/2010 |

OTHER PUBLICATIONS

Larcom, J.A.; Hong Liu; "Authentication in GPS-directed mobile clouds"; Globecom Workshops (GC Wkshps), 2013 IEEE; IEEE Conference Publications; Publication Year: Apr. 2013; pp. 470-475.*

(Continued)

*Primary Examiner* — Andrew Nalven
*Assistant Examiner* — Courtney Fields
(74) *Attorney, Agent, or Firm* — Silicon Valley Patent Group LLP

(57) ABSTRACT

Method and apparatus for SPS authentication, for example for use with GPS, are disclosed. The method may include receiving a first set of Y codes from a plurality of satellites, generating authentication decisions using W code estimates extracted from the first set of Y codes for satellite channels corresponding to the plurality of satellites, and generating an authentication response according to authentication decisions generated for the satellite channels.

37 Claims, 10 Drawing Sheets

(56) References Cited

U.S. PATENT DOCUMENTS

| | | | |
|---|---|---|---|
| 5,754,657 A * | 5/1998 | Schipper et al. | 380/258 |
| 5,757,916 A | 5/1998 | MacDoran et al. | |
| 5,955,987 A | 9/1999 | Murphy et al. | |
| 6,934,631 B2 | 8/2005 | Dentinger et al. | |
| 6,954,488 B1 | 10/2005 | Lennen | |
| 7,260,160 B1 | 8/2007 | Lennen | |
| 7,609,201 B2 | 10/2009 | Masuda | |
| 7,969,354 B2 | 6/2011 | Levin et al. | |
| 8,068,054 B2 | 11/2011 | Levin et al. | |
| 8,068,533 B2 | 11/2011 | Levin et al. | |
| 8,068,534 B2 | 11/2011 | Levin et al. | |
| 2007/0230545 A1 * | 10/2007 | Lennen | 375/149 |
| 2009/0195354 A1 | 8/2009 | Levin et al. | |
| 2012/0122471 A1 | 5/2012 | Kohli et al. | |

OTHER PUBLICATIONS

Humphreys, T.E. et al., "Assessing the Spoofing Threat: Development of a Portable GPS Civilian Spoofer," ION GNSS Conf., Sep. 2008, Savanna, GA.

U.S. Appl. No. 12/231,094, Secure Information Transfer Based on Global Position, Aug. 29, 2008.

International Search Report and Written Opinion—PCT/US2012/065696—ISA/EPO—Mar. 5, 2013.

Taiwan Search Report—TW101143109—TIPO—Jun. 9, 2014.

* cited by examiner

SPS AUTHENTICATION

CROSS REFERENCE TO RELATED APPLICATIONS

This application claims the benefit of U.S. provisional application No. 61/561,824, "GPS Authentication" filed Nov. 18, 2011. The aforementioned United States application is hereby incorporated by reference in its entirety.

FIELD

The present disclosure relates to the field of authentication. In particular, the present disclosure relates to SPS (satellite positioning system) and satellite signal authentication.

BACKGROUND

Conventional ad-hoc solutions do not meet the need for strong authentication as they merely check for internal consistency of signals, such as eliminating GNSS positions and velocities that are inconsistent with sensor readings or eliminating signal levels which may be too high caused by attempts to overwhelm a receiver with much stronger fake signals than the real signal.

Another conventional approach is to extract the Y code from broadcast satellites by pointing high gain antennas at each satellite, to compensate for the lack of correlation gain, which may be obtained by correlating with a known version of the local code, and by estimating the Y code per satellite in real time. This approach collects raw data from the satellite, and correlates them with another sample coming from the receiver whose position needs to be authenticated. Knowing the location of each satellite from ephemeris by blindly tracking the satellite location with steerable high gain antennas, inphase and quadrature (I/Q) samples are collected. An antenna gain of around 30 dB may be generally sufficient for this approach (which may be obtained, for example, by a parabolic antenna about 2 to 3 meters in diameter). The satellite selection is done by spatial diversity, for example assuming that the antenna is correctly pointed to the satellite and that no other satellite is crossing the high gain antenna beam. However, this approach can create ambiguity with regards to which signal is being correlated with and may require specific antenna configurations.

Another problem with the above conventional approach is that coarse acquisition (C/A) code is also received along with Y code as it is orthogonal to the Y code. The I/Q samples need to be rotated orthogonally with the C/A code to have only the Y code subsisting into the raw signal. As a result, with the conventional approach, each satellite is tracked separately by an individual steerable high gain antenna, which significantly increases its cost.

In addition, when the satellites cross paths, there may be ambiguity about which satellites are being tracked, and the authentication with these satellites may need to be temporarily stopped. In some conventional solutions, in order to reduce cost, only one Y code signal can be authenticated, and the rest is considered genuine. These solutions limit the level of protection that can be offered as they do not cover the case of real collected signal (comprising all Y codes), with fake C/A codes superimposed.

Therefore, there is a need for methods and systems that can address the above issues of conventional solutions.

SUMMARY

The present disclosure relates to SPS satellite signal authentication, which is also referred to as antispoofing.

According to embodiments of the present disclosure, a method of authentication comprises receiving a first set of Y codes from a plurality of satellites, generating authentication decisions using W code estimates extracted from the first set of Y codes for satellite channels corresponding to the plurality of satellites, and generating an authentication response according to authentication decisions generated for the satellite channels.

In another embodiment, a method of authenticating a mobile device includes receiving a first set of Y codes from a plurality of satellites via a trusted satellite broadcast, receiving a second set of Y codes from the plurality of satellites via a mobile device, generating authentication decisions using W code estimates extracted from the first set of Y codes and the second set of Y codes for satellite channels corresponding to the plurality of satellites, and generating an authentication response according to the authentication decisions generated for the satellite channels.

In yet another embodiment, an apparatus comprises an authentication module including processing logic. The processing logic comprises logic configured to receive a first set of Y codes from a plurality of satellites via a trusted satellite broadcast, logic configured to receive a second set of Y codes from the plurality of satellites via a mobile device, logic configured to generate authentication decisions using W code estimates extracted from the first set of Y codes and the second set of Y codes for satellite channels corresponding to the plurality of satellites, and logic configured to generate an authentication response according to the authentication decisions generated for the satellite channels.

In yet another embodiment, a non-transitory medium storing instructions for execution by one or more computer systems, the instructions comprise code for receiving a first set of Y codes from a plurality of satellites at a mobile device, code for generating authentication decisions using W code estimates extracted from the first set of Y codes for satellite channels corresponding to the plurality of satellites, and code for generating an authentication response according to authentication decisions generated for the satellite channels.

In yet another embodiment, a system comprises at least one processor and an authentication module configured to work with the at least one processor. The authentication module includes means for receiving a first set of Y codes from a plurality of satellites via a trusted satellite broadcast, means for receiving a second set of Y codes from the plurality of satellites via a mobile device, means for generating authentication decisions using W code estimates extracted from the first set of Y codes and the second set of Y codes for satellite channels corresponding to the plurality of satellites, and means for generating an authentication response according to the authentication decisions generated for the satellite channels.

In yet another embodiment, a method comprises receiving an encrypted code, determining information about a sequence used to encrypt the encrypted code, and transmitting the information to a device for authentication, where transmitting the information is based at least in part on an extracted sequence to a device for authentication.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

Figure 1:
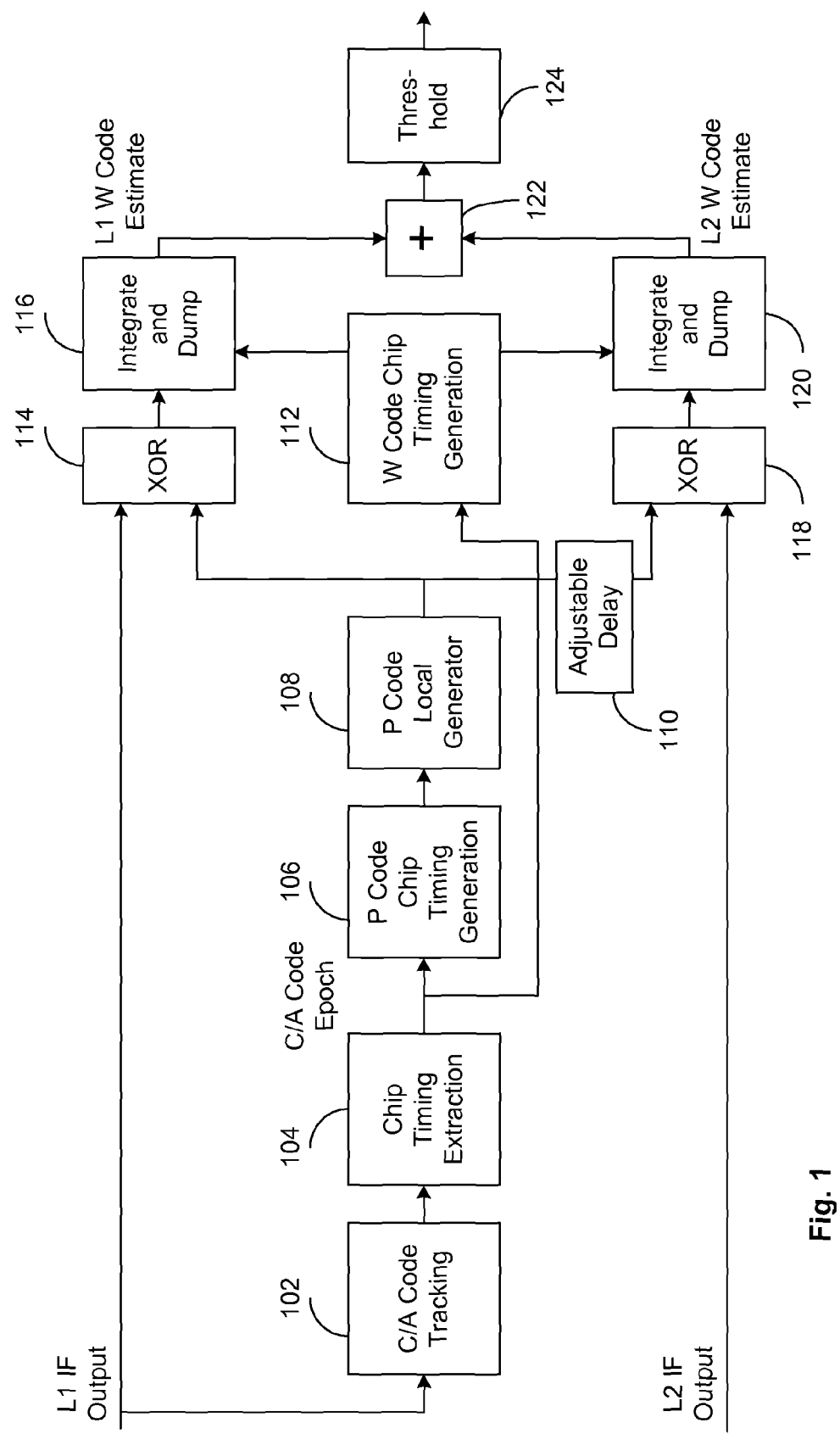
FIG. 1 illustrates a method of estimating W code using dual frequencies according to some aspects of the present disclosure.

Embodiments of SPS authentication are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Authentication of position and/or time provides ways to verify that wireless signals used for position and/or time computation are coming from a legitimate over-the-air SPS broadcast, for example a GNSS broadcast, in real time, for example as opposed to being replayed from a record of real data. Embodiments of the present disclosure show 1) a wireless signature, for example in the RF spectrum, which is difficult to forge and may be identified in signals received by a mobile computing device to be authenticated; 2) a reference of the same signal obtained about the same time in a trusted way; 3) a secure way to transmit the signature to a certifying entity; and/or 4) a trusted authenticating authority that can compare both, and securely deliver to the final user of the authentication (which may or may not be the user of the mobile device) an indication of the authenticity of the position. Note that embodiments are described herein using GPS as examples. The descriptions provided herein, however, may be applied to other forms of SPS applications.

The embodiments of the present disclosure may be applied to authenticate a mobile device in banking and e-commerce applications in some implementations. For example, a bank may send an authentication request to a mobile device that runs a banking application. In response, the mobile device may send satellite broadcast data it received to a server for authentication. The server may use a corresponding satellite broadcast received via a previously verified channel to authenticate the mobile device, and generate an authentication response to the bank. For another example, a merchant may send an authentication request to a mobile device that runs an online shopping program. In response, the mobile device may send satellite broadcast data it received to a server for authentication. The server may use a corresponding satellite broadcast received via a previously verified channel to authenticate the mobile device, and generate an authentication response to the merchant. In some embodiments, a mobile device may report or provide a location, position, and/or GPS data, for example to a bank or e-commerce entity or another entity. Certain embodiments described herein may be used to verify or authenticate the location, position, and/or GPS data.

FIG. 1 illustrates a method of estimating W code using dual frequencies according to some aspects of the present disclosure. In the exemplary implementation shown in FIG. 1, the method determines correlations between satellite signals from two input frequency carriers, namely L1 and L2. The method may include C/A code tracking block 102, chip timing extraction block 104, P code chip timing generation block 106, P code local generator block 108, adjustable delay block 110, W code chip timing generation block 112, a first XOR block 114, a first integrate and dump block 116, a second XOR block 118, a second integrate and dump block 120, summation block 122, and/or threshold block 124. According to aspects of the present disclosure, the input signals can be processed and transmitted among the blocks as shown in FIG. 1. Note that the method of estimating W code described in FIG. 1 may be used for W code extraction as described in FIG. 4 and FIG. 6 below, for example at one or more of blocks 404 and/or 610.

According to certain embodiments of the present disclosure, instead of tracking individually each satellite with a high gain, a single antenna may be used to collect signals from a plurality of satellites in view from a given location. In the exemplary implementation shown in FIG. 1, the Y code is generated by XOR-multiplying the P code (published) and W code (locally generated by using the encryption keys). W code can be specific to each satellite. In one approach, the W code (0.5 MHz) can be extracted for each satellite by multiplying by P code on L1 signal and by a delayed P code on L2 side, thus obtaining two versions of W code estimation. In some embodiments, L1 and L2 may indicate different carrier frequencies. In some embodiments, one of the W code estimates can be selected for use, or the two versions of W code estimation can be recombined to obtain a W code estimate. Each W code estimate may be satellite dependent, and may be extracted individually.

The W code estimation on L1 side may be performed by phase synchronizing the local oscillator onto the C/A code, then by collecting the rotated signal that is at 90 degrees in quadrature with the C/A code signal. A timing is extracted from C/A code timing, and applied to the quadrature signal in order to integrate and dump signals. Each W code chip may be integrated during the duration of the W code chip.

According to embodiments of the present disclosure, a similar operation may be performed on the L2 side. Both integrate and dump outputs may be summed, and then compared with a threshold, for example a zero threshold. If the output is positive, the W code chip estimate is +1; otherwise W code chip estimate is −1. The combination of integrate and dump outputs before W code chip estimate may result in an equivalent 3 dB higher signal to noise ratio (SNR), and thus a lower chip error rate.

The W code estimate described above may be implemented in a server-based authentication solution, which is described in association with FIG. 3 and FIG. 4 below. Alternatively or additionally, it may be implemented in a mobile-based authentication solution, which is described in association with FIG. 5 and FIG. 6 below.

Figure 2:
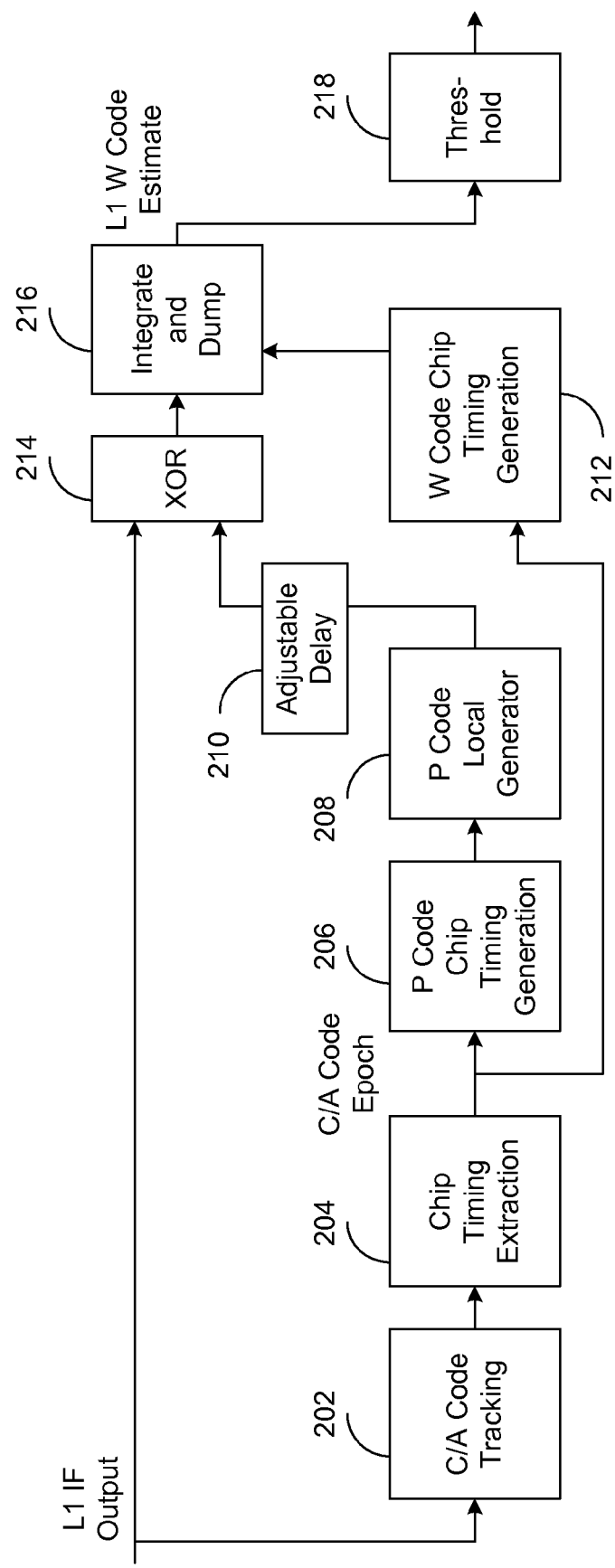
FIG. 2 illustrates another method of estimating W code according to some aspects of the present disclosure.

FIG. 2 illustrates another method of estimating W code according to some aspects of the present disclosure. In the exemplary implementation shown in FIG. 2, the method estimates W code using a single frequency carrier, namely L1 IF Output. The method may include C/A code tracking block 202, chip timing extraction block 204, P code chip timing generation block 206, P code local generator block 208, adjustable delay block 210, W code chip timing generation block 212, XOR block 214, integrate and dump block 216, and/or threshold block 218. According to aspects of the present disclosure, the input signal L1 IF Output can be processed and transmitted among the blocks as shown in FIG. 2. Note that the method of estimating W code described in FIG. 2 may be used for W code extraction as described in FIG. 4 and FIG. 6 below, for example at one or more of blocks 404 and/or 610.

In the exemplary implementation shown in FIG. 2, W code estimation may be implemented using a single frequency carrier. Note that the final authentication may be accomplished by correlating the W code estimate from a mobile device (to be authenticated) and W code estimate from a server (for example that is genuine, e.g., received from a validated and protected location), for each satellite, and combining authentication decisions from corresponding satellites into a global decision.

According to embodiments of the present disclosure, there are multiple ways to apply the methods described in FIG. 1 and FIG. 2. For example, in one approach, the mobile collects I/Q samples and sends them to an authenticating authority "as is", allowing the authenticating authority to extract the W code before comparison may take place. In another approach, the W code may be extracted locally at the mobile device, and the W code estimate can be sent to the certifying authority, which can then perform the comparison. The latter approach has the advantage of having very low payload, and may shift some functions to the mobile device to implement the correlation with P code. Thus, a mobile device may be configured to determine and transmit or otherwise output the W code or I/Q samples that may be used to determine the W code.

In other embodiments, for example in embodiments with access authorization to the Y code generation keys and algorithms, the Y code may not be collected in real time, but rather can be synthesized locally when needed. This approach may provide a stronger authentication, as the Y code can be generated and transmitted to the authenticating entity ahead of broadcast time, thus reducing the authentication latency and reducing the replay threat.

As shown in the examples above, the present disclosure has provided numerous advantages. First, a single antenna, with no tracking or steering capabilities, may be utilized at each reference location for configurations described in association with FIG. 1 and/or FIG. 2. In other embodiments, the Y code may be synthesized locally if access authorization to the Y code generation keys and algorithms is available. Second, an RF signature being sent can be quite small if the W code is sent instead of sending I/Q samples. Note that the RF signature may be the message sent to the authenticating authority by the mobile. It can be the raw I/Q samples, or the W sequence. The RF signature can be used to sign the signal which the receiver uses for computing its position. In this way, authentication may be performed without significant overhead traffic, and data exchanged between a mobile and a server may be kept relatively low. Furthermore, with at least some of the disclosed embodiments, processing gain may be reduced or eliminated.

According to certain embodiments of the present disclosure, W code can be a pseudo random sequence generated by the satellite, and mixed (XORed) with the P code for Y code generation. The disclosed methods may extract and estimate W from the I/Q samples, which comprise "data" that can be sent as a signature to the authenticating authority. Note that W code may include 512 KB per second, and 250 to 500 chips of W code estimate or 0.4 ms (millisecond) to 0.8 ms of W code collection may be sufficient for authentication.

In some approaches, 250 to 500 chips may be used for a positive correlation (also referred to as comparison) of W code. This is an estimate based, at least in part, on the size of the secure encryption keys in modern cryptography, around 256 to 500 bits. In order to collect 250 to 500 chips, at a chip rate of about 500 KHz, 0.4 ms to 0.8 ms of IQ samples may be used to estimate that amount of chips. In this way, fewer chips may be used than in certain other methods. In some implementations, W code-capable receivers may be used to output the W code. For example, survey grade GPS receivers can be configured to use some form of internal W code estimation (e.g., semi-codeless) to generate full carrier phase measurements, and such survey grade GPS receivers may be modified to output the W code.

Note that the certain embodiments disclosed herein may work in very low SNR (signal to noise ratio) environments, for example in some applications at the low level of indoor tracking capabilities of existing high sensitivity receivers. In these applications, a longer W code estimate may be employed to compensate for the higher chip error rate. Note that it may be advantageous to be able to work anywhere a high sensitivity receiver can track. This is not the case for conventional message-based authentication methods (where a part of the broadcast message is encrypted), which may work only at SNR levels compatible with a good message decoding capability. For a very low SNR, the erroneous W code chips in the estimate may increase; thus more chips can be used in the comparison to compensate for this lower quality, and still get an acceptable cross correlation level for authentication purposes.

According to embodiments of the present disclosure, the correlation may be made on estimated W code that has roughly 1% of chip error. To reach a given level of performance, longer sample duration (larger message size) may be used at the mobile device. In some implementations, the long sample duration may be mitigated by extracting the W code chips in the mobile device, and sending the estimated chips, which may be more compact than the I/Q samples.

Figure 3:
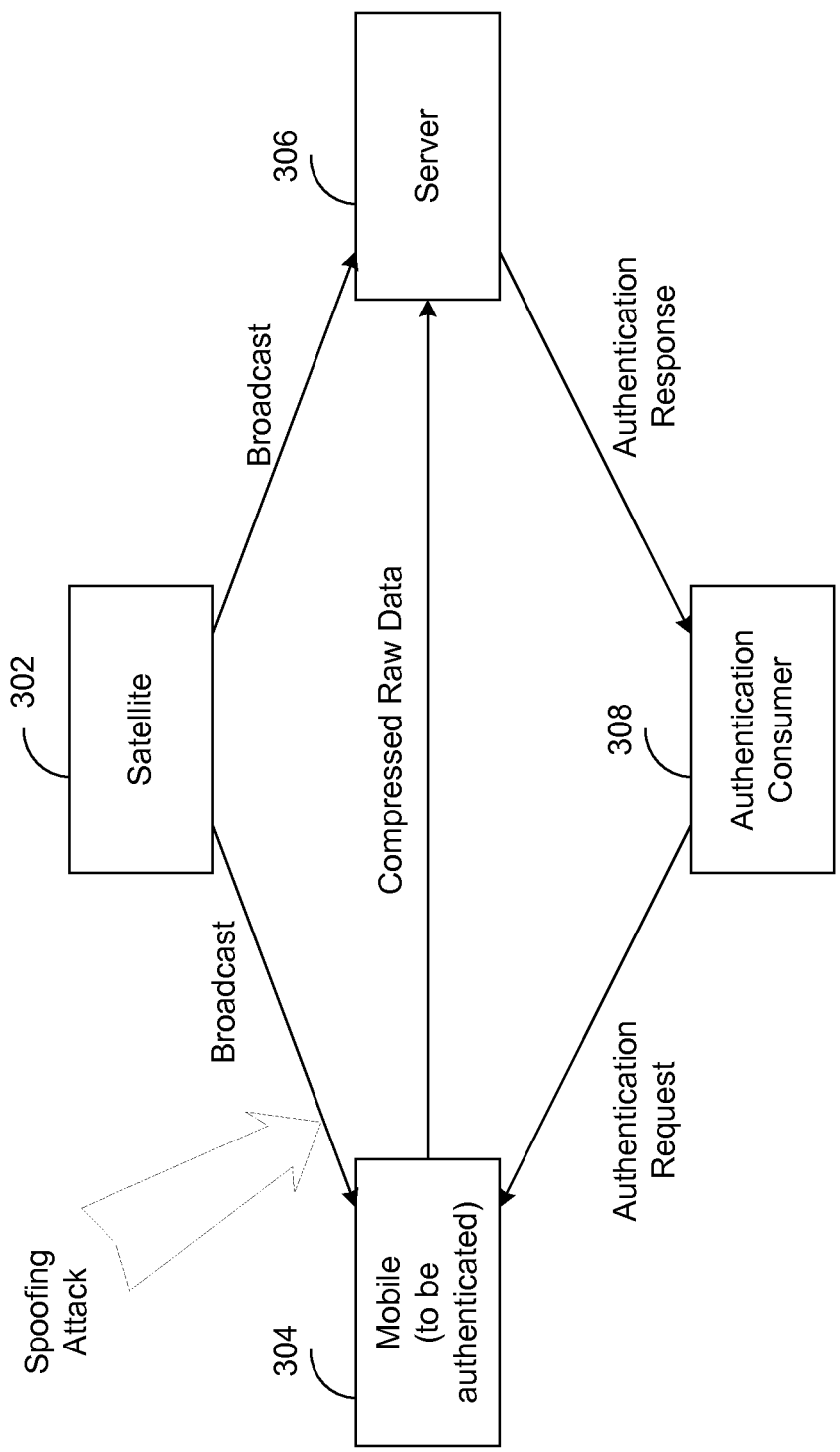
FIG. 3 illustrates a server based authentication solution according to some aspects of the present disclosure.

FIG. 3 illustrates a server based authentication solution according to some aspects of the present disclosure. In the exemplary implementation shown in FIG. 3, the authentication can be made by a server, for example the server 306. Each individual authentication operation can be supported by the server 306. Satellite 302, authenticated entity (mobile device) 304, authentication consumer/requestor (example bank) 308, and server 306 may communicate with one another as shown in FIG. 3. In this example, the broadcast from satellite 302 is received at both the mobile 304 and server 306. A spoofing attack may be on the signal to be received by the mobile 304. The authentication consumer 308 may send an authentication request to the mobile 304 and/or the server 306. The mobile 304 may send compressed raw data to the server for authentication, or the authentication consumer 308 may receive such data from the mobile 304 and transmit the data to the server 306. This data may comprise any of the Y code, W code, IQ samples, signature, information described above, and/or other data. The server 306 sends an authentication response to the authentication consumer 308 upon completion of the authentication, for example based on W codes received from the mobile 304 and/or authentication consumer 308, and/or W codes extracted from data received from the mobile 304 and/or authentication consumer 308.

Note that the authentication request, the compressed raw data, and the authentication response messages may be encrypted between devices; thus, the authentication request, the compressed raw data, and the authentication response messages, and/or other embodiments described herein may be used to reduce or eliminate spoofing. In this example, an RF signal received at the user mobile device (e.g., from an RF simulator generating over the air GPS-like signals) can be assumed to be vulnerable. The RF signals received at the server, which may include a reference station, may be assumed to be secure or may be verified or considered trusted, as described below. The authentication may be consumed by the authentication consumer, such as a bank. For example, the authentication may be performed for an authorization of a fund transfer triggered by the mobile user. The authentication may be used to verify an identify of the mobile, a location, a position, and/or GPS data of the mobile, for example, in order to determine whether to authorize the fund transfer.

Figure 4:
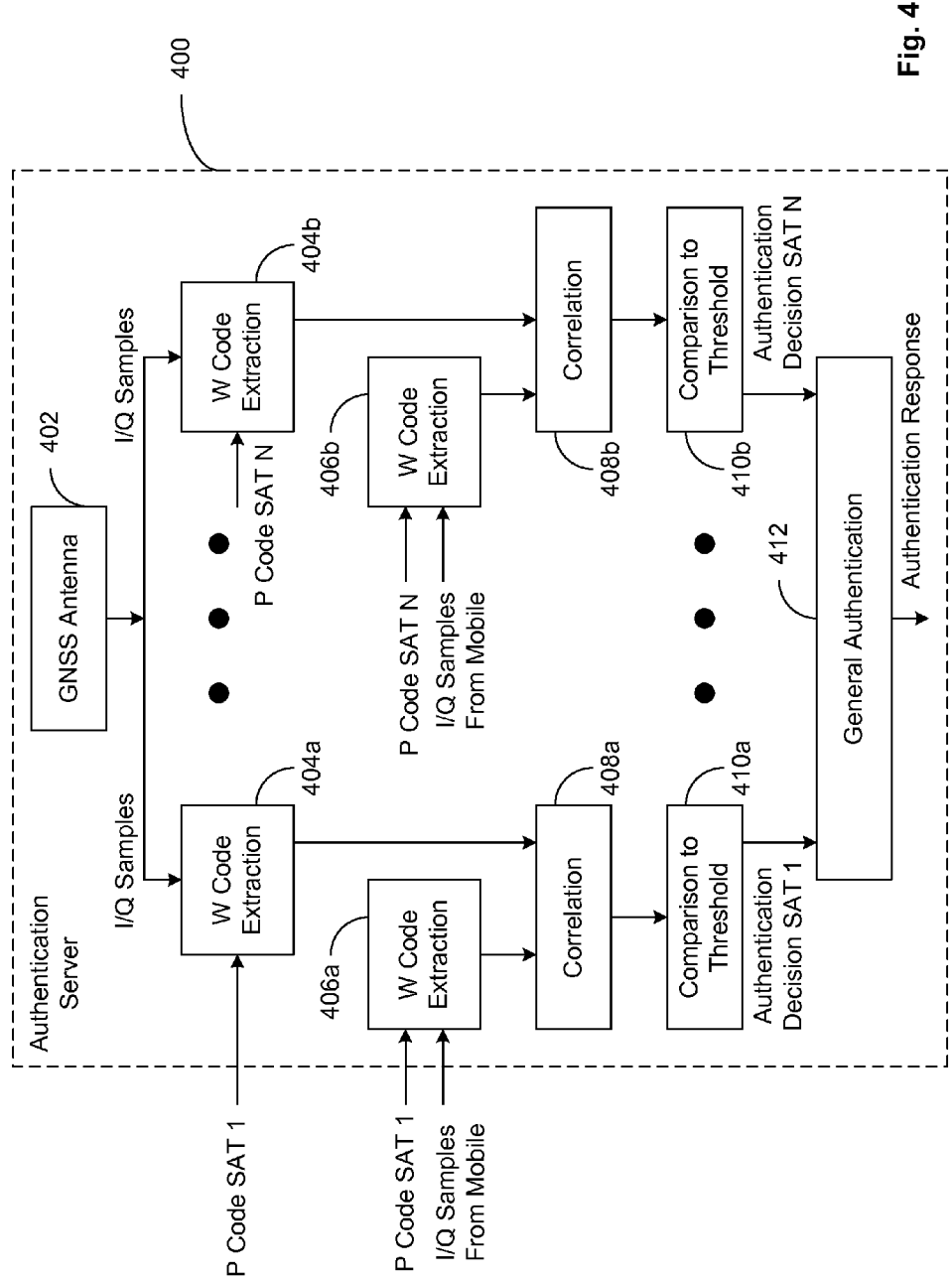
FIG. 4 illustrates exemplary functional blocks of the server of FIG. 3 according to some aspects of the present disclosure.

FIG. 4 illustrates exemplary functional blocks of the server of FIG. 3, for example the server 306, according to some aspects of the present disclosure. As shown in FIG. 4, server 400 is configured to perform authentication based, at least in part, on signals received from one or more satellites, for example one or more satellites 302, which may comprise SAT1 to SAT N. The satellite signal received by the GNSS antenna 402 of the server may be verified via various means in some embodiments and thus may be considered to be trusted (and valid), may considered to be trusted based on being received in a secure or trusted location or based on one or more other metrics, or may be assumed valid by the server 400 in some embodiments. In one exemplary approach, blocks W Code Extraction 404a, W Code Extraction 406a, Correlation 408a and Comparison to Threshold 410a are configured to process signals received from SAT 1 and to generate an authentication decision related to SAT1. For example, W Code Extraction block 404a may use I/Q samples from the GNSS antenna 402 of the server 400 and P Code from SAT 1 to create a first W Code estimate. W Code Extraction block 406a may use I/Q samples from the mobile device 304 and P Code from SAT 1 to create a second W Code estimate. The first W Code estimate and the second W Code estimate can then be correlated in the Correlation block 408a, and the output of the Correlation block 408a compared to a threshold in block 410a to generate an authentication decision for signals received from SAT1.

The above operations as described in reference to SAT1 may be performed for signals received from other satellites. For example, W Code Extraction block 404b may use I/Q samples from the GNSS antenna 402 of the server 400 and P Code from SAT N to create a third W Code estimate. W Code Extraction block 406b may use I/Q samples from mobile and P Code from SAT N to create a fourth W Code estimate. The third W Code estimate and the fourth W Code estimate can then be correlated in the Correlation block 408b, and the output of the Correlation block 408b is compared to a threshold in block 410b to generate an authentication decision for signals received from SAT N.

The General Authentication block 412 may then take the individual authentication decisions from blocks 410 with respect to signals received from each satellite to generate a combined authentication response which may be a global decision generated by the server 400. Note that in some implementations, the server 400 may wait for all individual authentication decisions to be completed before making the global decision. In some other implementations, the server 400 may add each individual authentication decision with respect to signals received from a satellite as each individual authentication decision becomes available. The server 400 may then compare the sum of correlations to a predetermined global threshold to make an authentication decision. In this manner, the server 400 may stop waiting for additional individual authentication decisions after the predetermined global threshold (for example 95% of the individual decisions have been received) has been reached.

Note that the predetermined global threshold may be based on the number of satellites and/or the expected chip error rate on the reference station and/or on the mobile. In some implementations, the predetermined global threshold may depend on the signal to noise ratio (SNR). For example, if the SNR is low, it may be assumed that the bit rate may be higher. The predetermined global threshold may be adjusted to be lower if there is a high false positive rate.

Figure 5:
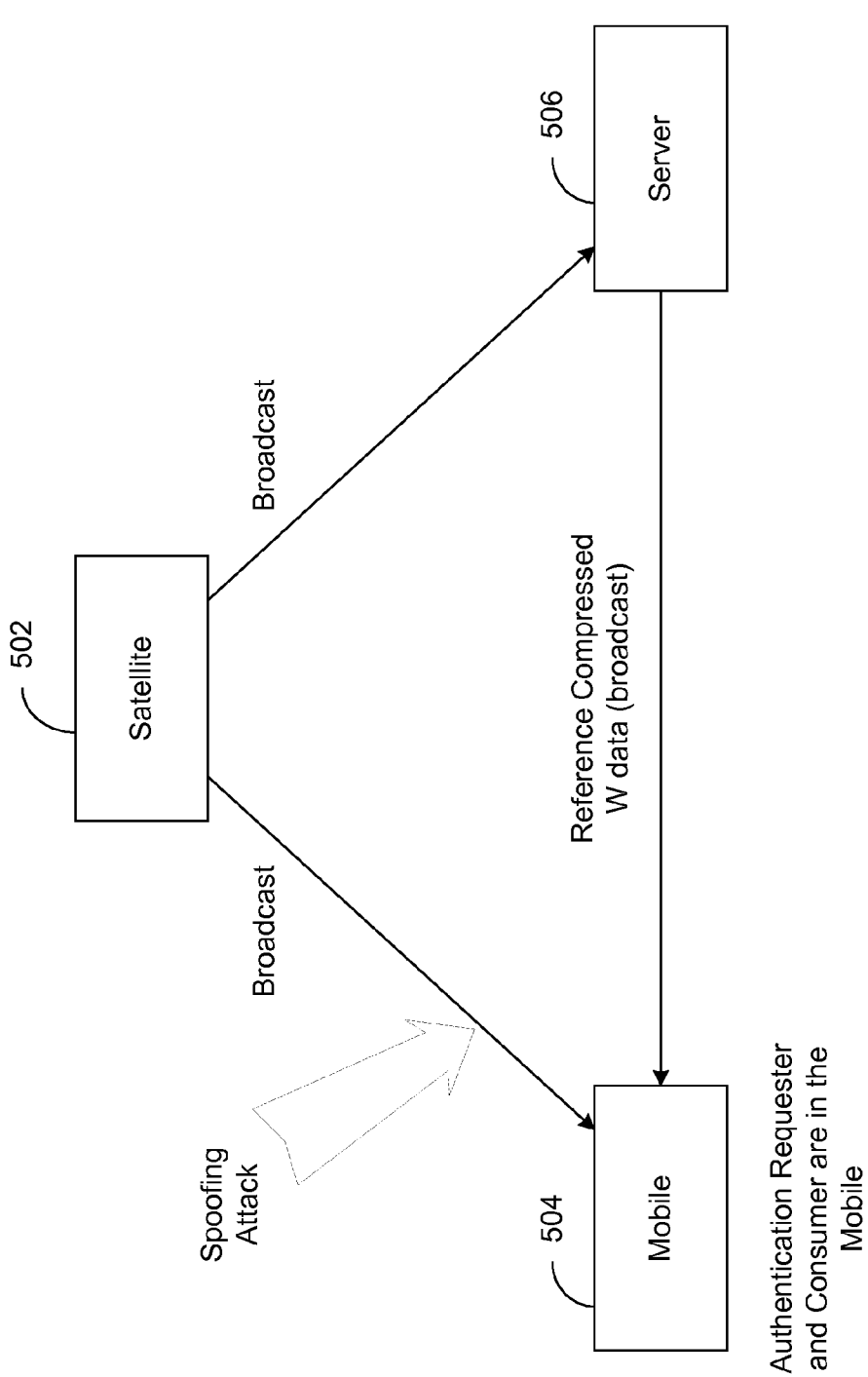
FIG. 5 illustrates a mobile based authentication solution according to some aspects of the present disclosure.

FIG. 5 illustrates a mobile based authentication solution according to some aspects of the present disclosure. In this exemplary approach, the broadcast from satellite 502 is received at both the mobile 504 and server 506. A spoofing attack may be on the signal to be received by the mobile 504. The mobile 504 can be both the authentication requester and the authentication consumer. The mobile 504 receives reference compressed W data from the server 506, and uses the compressed W data to perform authentication of broadcast signals received from satellite 502. The mobile 504 may additionally or instead receive any of the Y code, IQ samples, signature, information described above, and/or other data from the server 506 and extract a W code therefrom in order to perform authentication of the broadcast signals.

In this approach, the load on the server (e.g., reference data broadcast) may be lighter. This is because the comparison and correlation may be done on board of the mobile device. In this case, the mobile device may be considered secure, and the environment may be considered hostile. Embodiments described herein may be used to detect tampering of the received signals and report such tampering to the mobile user. The authentication request may be generated and consumed from inside the mobile, as may the authentication response.

Figure 6:
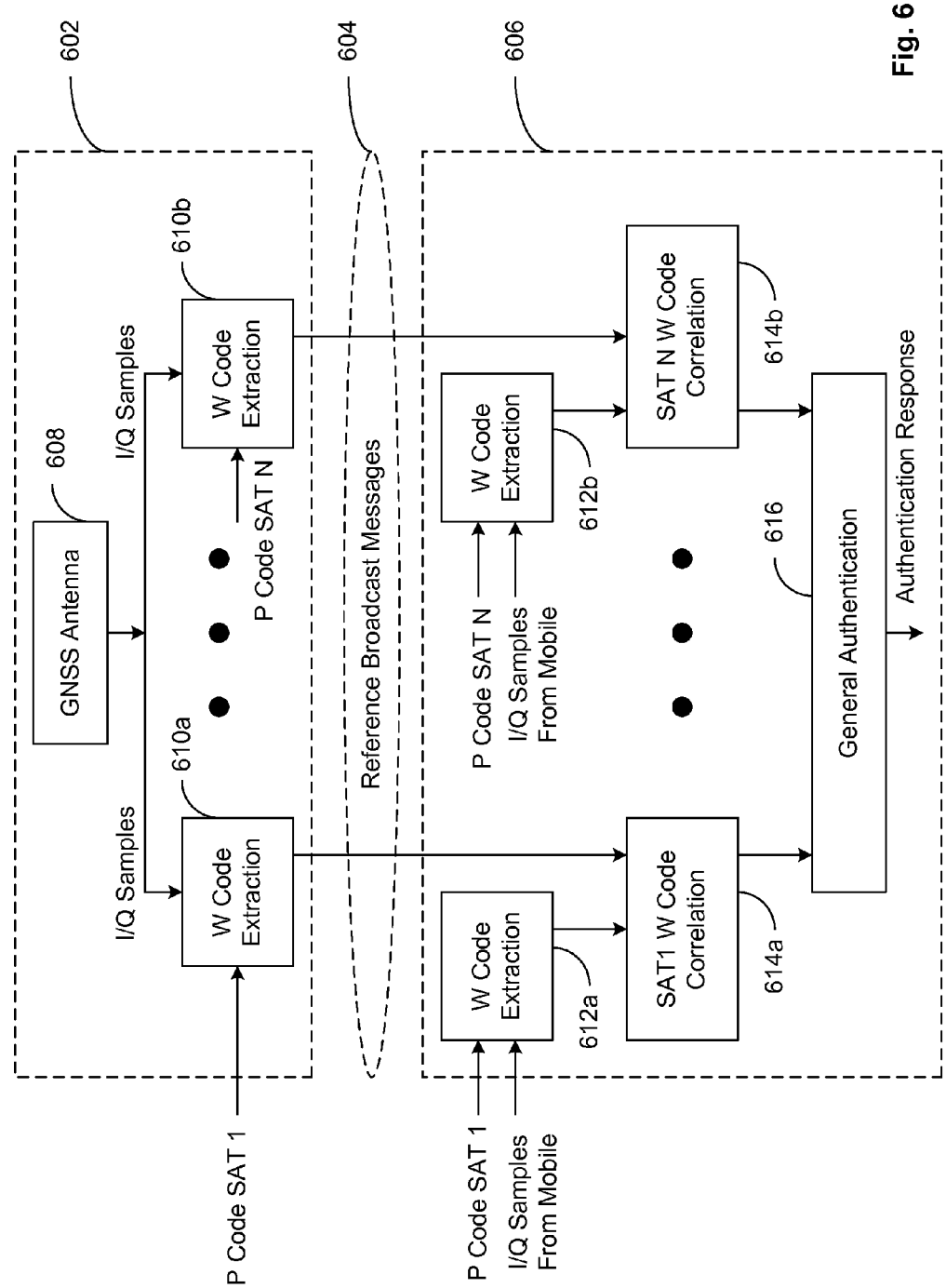
FIG. 6 illustrates exemplary functional blocks of the mobile and server of FIG. 5 according to some aspects of the present disclosure.

FIG. 6 illustrates exemplary functional blocks of the mobile and server of FIG. 5 according to some aspects of the present disclosure. The authentication may be consumed by the mobile device (for example a user). Another example of an authentication of this case may be for aircraft GPS navigation, where an aircraft may authenticate the GPS navigation signals it received using the methods described in FIG. 5 and FIG. 6. In the exemplary implementation shown in FIG. 6, block 602 indicates functions performed by server 506 and block 606 indicates functions performed by the mobile 504. Reference broadcast messages 604 may be sent from the server 506 to the mobile 504.

In one exemplary approach, server 602 may be configured to receive signals from one or more satellites, for example P Codes from one or more satellites 502, which may comprise SAT1 to SAT N. The satellite signal received by the GNSS antenna 608 of the server 602 may be considered to be valid. The W Code Extraction block 610a may use I/Q samples from the GNSS antenna 608 and P Code from SAT 1 to create a first W Code estimate. Similarly, the W Code Extraction block 610b may use I/Q samples from the GNSS antenna 608 and P Code from SAT N to create a Nth W Code estimate. The W Code estimates may be sent to the mobile 606 as reference broadcast messages 604.

According to an exemplary approach, blocks W Code Extraction 612a and SAT 1 W Code Correlation 614a are configured to process signals received from SAT 1 and to generate an authentication decision related to SAT1. For example, W Code Extraction block 612a may use I/Q samples received by the mobile 606 and P Code from SAT 1 to create a second W Code estimate. The first W Code estimate (from server 602) and the second W Code estimate can then be correlated in the SAT 1 W Code Correlation 614a to generate an authentication decision for signals received from SAT1.

The above operations as described in reference to SAT1 in the mobile 606 may be performed for signals received from other satellites. For example, W Code Extraction block 612b may use I/Q samples received by the mobile 606 and P Code from SAT N to create a third W Code estimate. The third W Code estimate and the Nth W Code estimate (from the server 602) can then be correlated in the SAT N W Code Correlation block 614b to generate an authentication decision for signals received from SAT N.

The General Authentication block 616 may then take the individual authentication decisions from blocks 614 with respect to signals received from each satellite to generate a combined authentication response which may be a global decision generated by the mobile 606. Note that in some implementations, the mobile 606 may wait for all individual authentication decisions to be completed before making the global decision. In some other implementations, the mobile 606 may add each individual authentication decision with respect to signals received from a satellite as each individual authentication decision becomes available. The mobile 606 may then make a global authentication decision. In this manner, the mobile 606 may stop waiting for additional individual authentication decisions after the predetermined global threshold (for example 90% of the decisions from individual satellite path have been received) has been reached.

Note that the predetermined global threshold may be based on the number of satellites and/or the expected chip error rate on the reference station and/or on the mobile. In other implementations, the predetermined global threshold may depend on the signal to noise ratio (SNR). For example, if the SNR is low, it may be assumed that the bit rate may be higher. The predetermined global threshold may be adjusted to be lower if there is a high false positive rate.

In some embodiments, methods described herein can be applied to authenticate an RF signal coming from a satellite. If this signal is authenticated, it may be deemed that the RF signal comes from live broadcast, and may not need to be authenticated further. This approach may be challenging with replay situations, where a real signal may be collected by a spoofer, and fake C/A code signals may be superimposed onto a live record. In this situation, the authentication may be achieved, but the C/A code signals used for position computation may have been tampered with. To address this issue, certain of the methods described herein may be used to first authenticate all Y code signals present in the received RF. It may then be verified that the timing of the C/A code and the timing of the P code found in the RF signature sent by the user mobile receiver to the server are consistent (i.e. are aligned). It is desirable in many scenarios that the position computed by the mobile device (from the C/A code that may be present in the RF signature) is using C/A real broadcast signals, and that the position can be trusted. Furthermore, the authentication server may be configured to check the mobile position by computing it from the RF signature. The authenticated position may be delivered to the authentication consumer from the authenticating server, and thus may not have to be computed by the mobile device.

Figure 7:
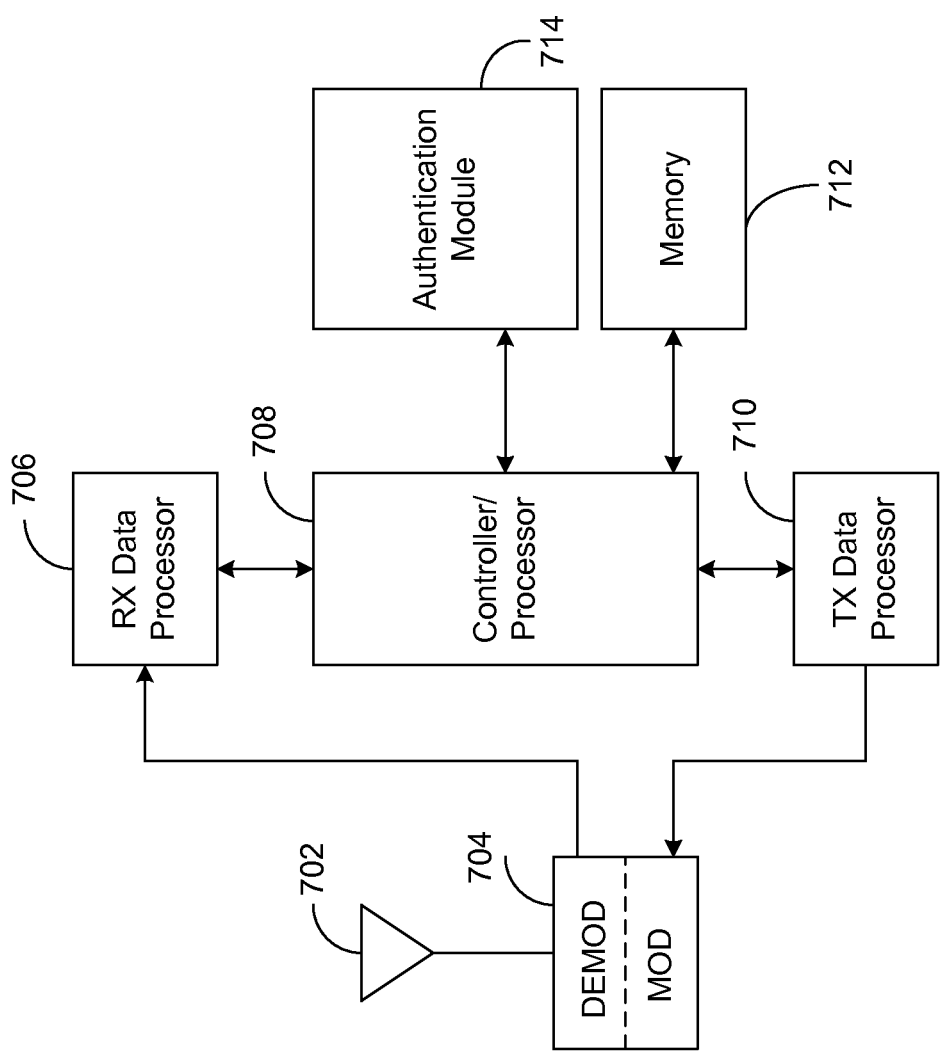
FIG. 7 illustrates an exemplary block diagram of an apparatus for GPS authentication according to some aspects of the present disclosure.

FIG. 7 illustrates an exemplary block diagram of an apparatus for GPS authentication according to some aspects of the present disclosure. In some embodiments, the apparatus illustrated in FIG. 7 and/or described below may be used to implement the server in any of FIGS. 3-6, for example the server 306, 400, 506, and/or 606. In some embodiments, the apparatus illustrated in FIG. 7 and/or described below may be used to implement the mobile device in any of FIGS. 3, 5, and 6, for example the mobile device 304, 504, and/or 602. As shown in FIG. 7, antenna 702 receives modulated signals from a base station and provides the received signals to a demodulator (DEMOD) part of a modem 704. The demodulator processes (e.g., conditions and/or digitizes) the received signal and obtains input samples. It may further perform orthogonal frequency-division multiplexing (OFDM) demodulation on the input samples and provide frequency-domain received symbols for all subcarriers. An RX data processor 706 processes (e.g., symbol de-maps, de-interleaves, and/or decodes) the frequency-domain received symbols and provides decoded data to a controller/processor 708 of the apparatus. In some implementations, the antenna 702 may be configured to receive and/or transmit GPS signals or other SPS signals from one or more satellites. In some embodiments, the apparatus includes a separate antenna (not illustrated) to receive such GPS or other SPS signals. For example, the antenna 402 or 608 may be included in the apparatus. Further, separate receive and/or processing circuitry and/or software may be included in the apparatus to process these signal, and may be in communication with the controller/processor 708, memory 712, and/or authentication module 714.

The controller/processor 708 can be configured to control the apparatus to communicate with another device via a wireless network. A TX data processor 710 may generate signaling symbols, data symbols, and/or pilot symbols, for example, which can be processed by modulator (MOD) of modem 704 and transmitted via the antenna 702, for example to a base station or directly to another device. In addition, the controller/processor 708 directs the operation of various processing units at the apparatus. Memory 712 can be configured to store program codes and data for the apparatus. Authentication module 714 can be configured to perform methods of authentication described above. For example, authentication module 714 and/or controller/processor 708 may be used to implement one or more of blocks 402-412 illustrated in FIG. 4 or one or more of blocks 612-616 illustrated in FIG. 6. As another example, authentication module 714 and/or controller/processor 708 may be used to implement one or more of blocks 608 and 610 illustrated in FIG. 6. In some implementations, portions of the functionalities of the controller/processor 708 and authentication module 714 may be implemented in multiple apparatuses, such as in one or more mobile devices and/or servers. In some other implementations, controller/processor 708 and authentication module 714 may reside in a server to implement methods of GPS authentication described in association with FIGS. 1-6. In some other implementations, controller/processor 708 and authentication module 714 may reside in a mobile device to implement methods of GPS authentication described in association with FIGS. 1-3 and 5-6. While the authentication module 714 is illustrated separate from other elements in the apparatus shown in FIG. 7, the authentication module 714 may be wholly or partially implemented by other elements illustrated in FIG. 7, for example in the controller/processor 708 and/or memory 712, or in another processor and/or memory of the apparatus or in one or more other elements of the apparatus.

Figure 8:
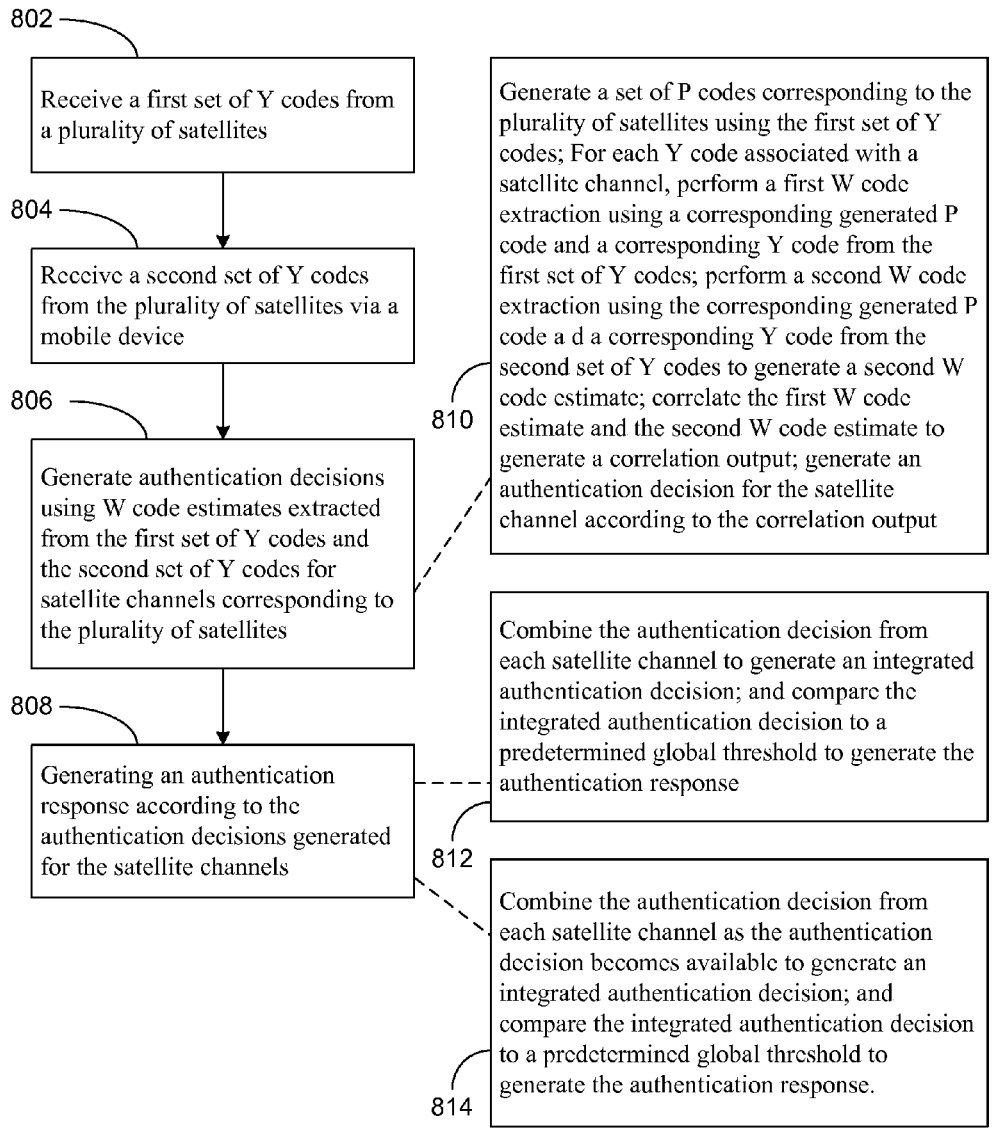
FIG. 8 illustrates a method of authenticating a mobile device according to some aspects of the present disclosure.
Figure 9:
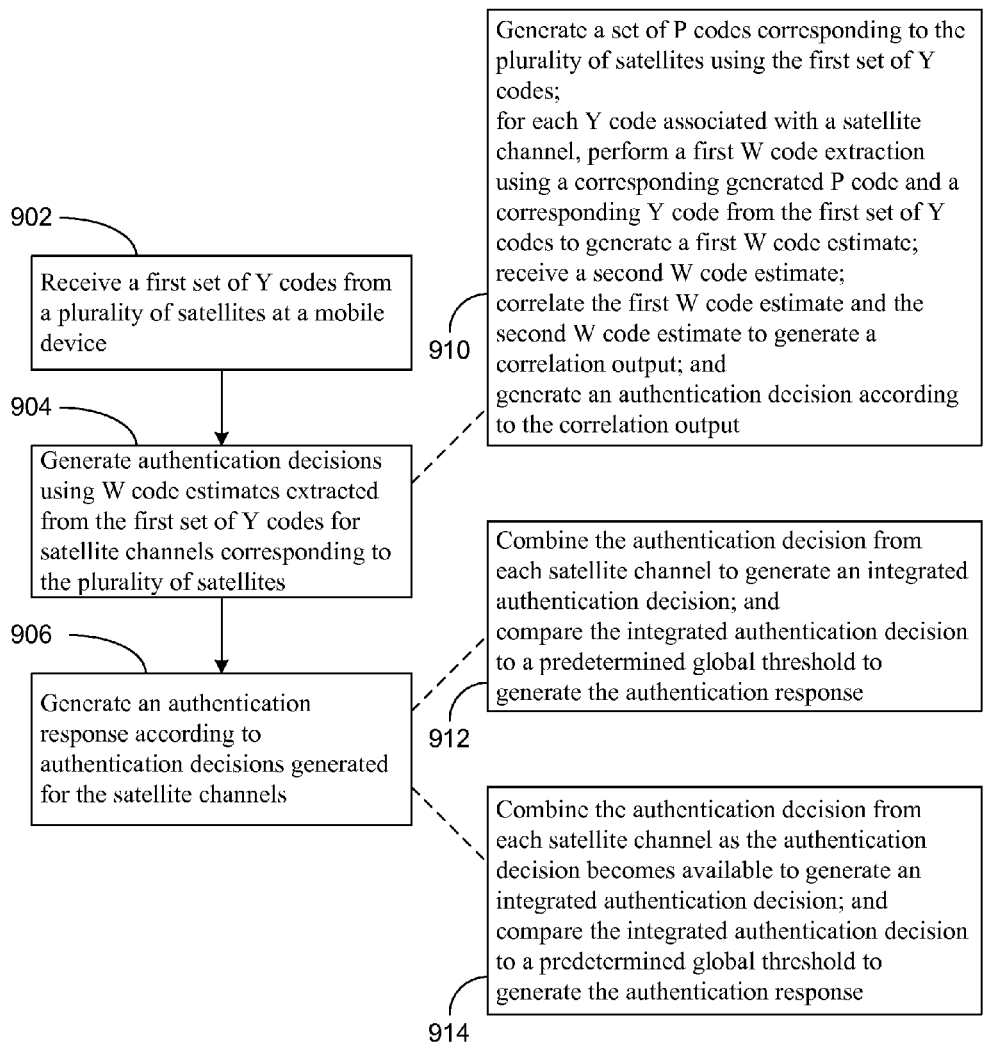
FIG. 9 illustrates a method of authenticating radio frequency signals according to some aspects of the present disclosure.
Figure 10:
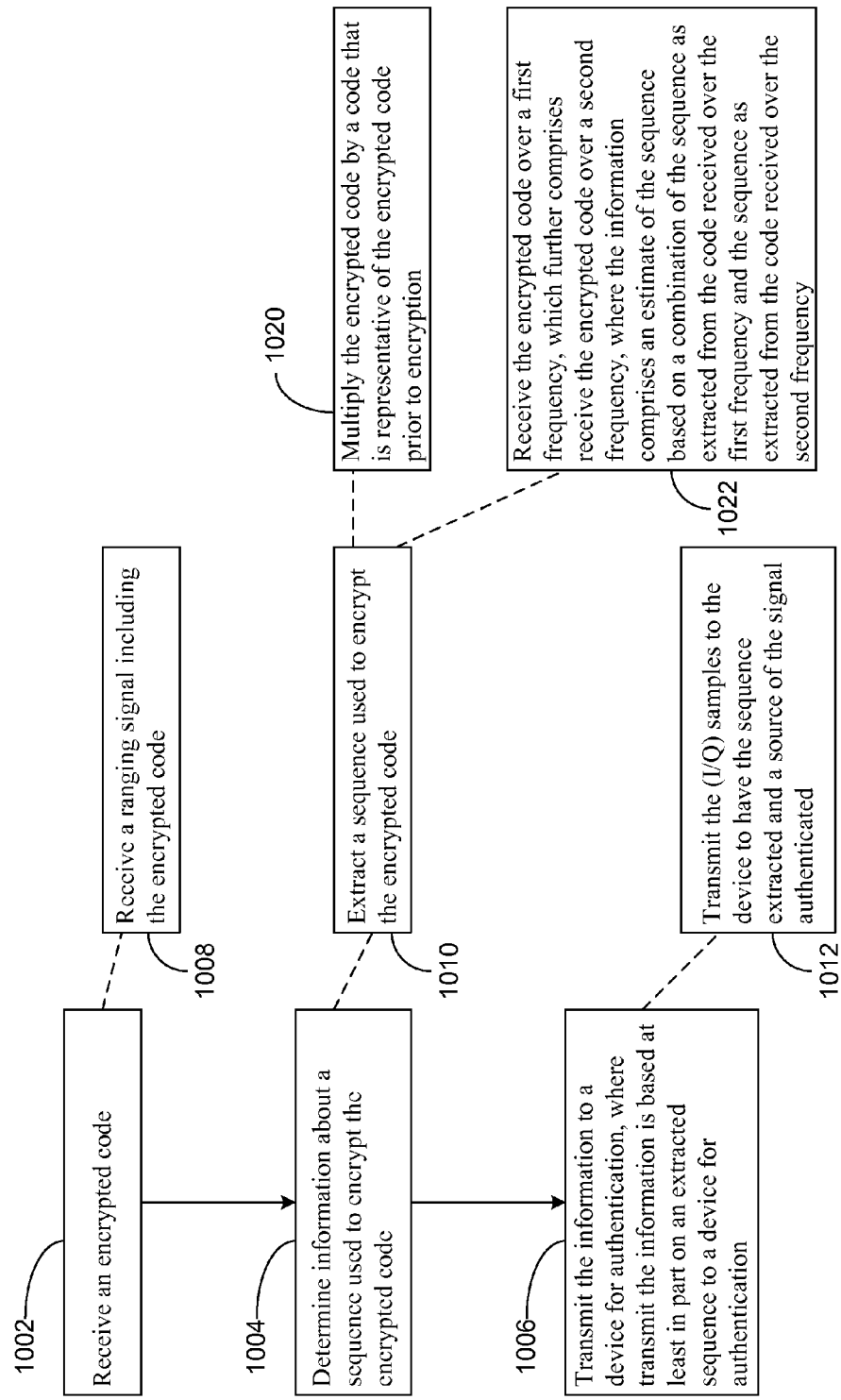
FIG. 10 illustrates a method of transmitting information for authenticating according to some aspects of the present disclosure.

According to some aspects of the present disclosure, the functions described in FIG. 8, FIG. 9, and/or FIG. 10 may be implemented by the controller/processor 708 or authentication module 714 of FIG. 7, or by a combination of the two, potentially in combination with one or more other elements. In some implementations, the functions may be performed by processor 708, software, hardware, and firmware or a combination of the above to perform various functions of the apparatus described in the present disclosure.

FIG. 8 illustrates a method of authenticating a mobile device according to some aspects of the present disclosure. In block 802, the processor 708 and/or authentication module 714 can be configured to receive a first set of Y codes from a plurality of satellites via a trusted satellite broadcast. In block 804, the processor 708 and/or authentication module 714 can be configured to receive a second set of Y codes from the plurality of satellites via a mobile device. In block 806, the processor 708 and/or authentication module 714 can be configured to generate authentication decisions using W code estimates extracted from the first set of Y codes and the second set of Y codes for satellite channels corresponding to the plurality of satellites. In block 808, the processor 708 and/or authentication module 714 can be configured to generate an authentication response according to the authentication decisions generated for the satellite channels. In some embodiments, W codes extracted from the first set of Y codes may be received or obtained at 802 instead of or in addition to receiving the first set of Y codes. In some embodiments, IQ samples from which the W codes may be derived are received or obtained at 802 instead of or in addition to receiving the first set of Y codes. In some embodiments, W codes extracted from the second set of Y codes may be received or obtained at 804 instead of or in addition to receiving the second set of Y codes. In some embodiments, IQ samples from which the W codes may be derived are received or obtained at 804 instead of or in addition to receiving the second set of Y codes.

According to embodiments of the present disclosure, the methods performed in block 806 may further include methods performed in block 810. In block 810, the processor 708 and/or authentication module 714 can be configured to generate a set of P codes corresponding to the plurality of satellites using the first set of Y codes; and for each Y code associated with a satellite channel, the processor 708 and/or authentication module 714 can be configured to perform a first W code extraction using a corresponding generated P code and a corresponding Y code from the first set of Y codes to generate a first W code estimate, and perform a second W code extraction using the corresponding generated P code and a corresponding Y code from the second set of Y codes to generate a second W code estimate; correlate the first W code estimate and the second W code estimate to generate a correlation output; and generate an authentication decision for the satellite channel according to the correlation output.

According to embodiments of the present disclosure, the methods performed in block 808 may further include methods performed in blocks 812 and 814. For example, in block 812, the processor 708 and/or authentication module 714 can be configured to combine the authentication decision from each satellite channel to generate an integrated authentication decision, and compare the integrated authentication decision to a predetermined global threshold to generate the authentication response. The predetermined global threshold may be determined based on at least one of: number of satellite channels used in determining the authentication response, expected chip error rate of the first W code extraction and the second W code extraction, and signal to noise ratio of the satellite channels. In block 814, the processor 708 and/or authentication module 714 can be configured to combine an authentication decision from each satellite channel as the authentication decision becomes available to generate an integrated authentication decision, and compare the integrated authentication decision to a predetermined global threshold to generate the authentication response.

FIG. 9 illustrates a method of authenticating radio frequency signals according to some aspects of the present disclosure. In the example shown in FIG. 9, the processor 708 and/or authentication module 714 can be configured to receive, for example at a mobile device (such as the mobile 504), a first set of Y codes from a plurality of satellites in block 902. In block 904, the processor 708 and/or authentication module 714 can be configured to generate authentication decisions using W code estimates extracted from the first set of Y codes for satellite channels corresponding to the plurality of satellites. In block 906, the processor 708 and/or authentication module 714 can be configured to generate an authentication response according to authentication decisions generated for the satellite channels.

According to embodiments of the present disclosure, the methods performed in block 904 may further include methods performed in block 910. In block 910, the processor 708 and/or authentication module 714 can be configured to generate a set of P codes corresponding to the plurality of satellites using the first set of Y codes. For each Y code associated with a satellite channel, the processor 708 and/or authentication module 714 can be configured to perform a first W code extraction using a corresponding generated P code and a corresponding Y code from the first set of Y codes to generate a first W code estimate, receive a second W code estimate, correlate the first W code estimate and the second W code estimate to generate a correlation output, and generate an authentication decision according to the correlation output. According to embodiments of the present disclosure, the methods performed in block 906 may further include methods performed in blocks 912 and 914. For example, in block 912, the processor 708 and/or authentication module 714 can be configured to combine the authentication decision from each satellite channel to generate an integrated authentication decision, and compare the integrated authentication decision to a predetermined global threshold to generate the authentication response. The predetermined global threshold may be determined based on at least one of: number of satellite channels used in determining the authentication response, expected chip error rate of the first W code extraction, and signal to noise ratio of the satellite channels. In block 914, the processor 708 and/or authentication module 714 can be configured to combine the authentication decision from each satellite channel as the authentication decision becomes available to generate an integrated authentication decision, and compare the integrated authentication decision to a predetermined global threshold to generate the authentication response. Note that the second W code output may comprise a reference broadcast message from a trusted server. The second W code output may be generated using a Y code and I/Q samples from the trusted server. Performing a first W code extraction may comprise generating the first W code estimate using a plurality of frequency carriers.

FIG. 10 illustrates a method of transmitting information for authenticating according to some aspects of the present disclosure. In the exemplary embodiment shown in FIG. 10, the processor 708 and/or authentication module 714 can be configured to receive an encrypted code in block 1002. In block 1004, the processor 708 and/or authentication module 714 can be configured to determine information about a sequence used to encrypt the encrypted code. In block 1006, the processor 708 and/or authentication module 714 can be configured to transmit the information to a device for authentication, where transmitting the information is based at least in part on a sequence extracted from the code.

According to embodiments of the present disclosure, the methods performed in block 1002 may further include methods performed in block 1008. For example, the processor 708 and/or authentication module 714 can be configured to receive a ranging signal including the encrypted code, where the ranging signal comprises a GNSS broadcast.

The methods performed in block 1004 may further include methods performed in block 1010, which may in turn be performed in blocks 1020 and 1022. For example, the processor 708 and/or authentication module 714 can be configured to extract a sequence used to encrypt the encrypted code. The information may comprise the extracted sequence. In block 1022, the processor 708 and/or authentication module 714 can be configured to multiply the encrypted code by a code that is representative of the encrypted code prior to encryption. In block 1022, the processor 708 and/or authentication module 714 can be configured to receive the encrypted code over a first frequency, which may further comprise receiving the encrypted code over a second frequency, and the information may comprise an estimate of the sequence based on a combination of the sequence as extracted from the code received over the first frequency and the sequence as extracted from the code received over the second frequency. The encrypted code may comprise a P code, and the sequence may comprise a W code.

The methods performed in block 1006 may further include methods performed in block 1012. In block 1012, the processor 708 and/or authentication module 714 can be configured to transmit the (I/Q) samples to the device to have the sequence extracted and a source of the signal authenticated. The device may comprise a remote authentication server configured to authentic a source from which the encrypted code was transmitted. The processor 708 and/or authentication module 714 can be further configured to receive an indication from the device that the encrypted code is authentic, and receive an indication from the device that a source from which the encrypted code was transmitted is authentic.

Note that at least paragraphs [0071]-[0073], FIG. 7, FIG. 8 and their corresponding descriptions provide means for means for receiving a first set of Y codes from a plurality of satellites via a trusted satellite broadcast; means for receiving a second set of Y codes from the plurality of satellites via a mobile device; means for generating authentication decisions using W code estimates extracted from the first set of Y codes and the second set of Y codes for satellite channels corresponding to the plurality of satellites; and means for generating an authentication response according to the authentication decisions generated for the satellite channels. At least paragraphs [0073], FIG. 7, FIG. 8 and their corresponding descriptions further provide means for generating a set of P codes corresponding to the plurality of satellites using the first set of Y codes; and for each Y code associated with a satellite channel, means for performing a first W code extraction using a corresponding generated P code and a corresponding Y code from the first set of Y codes to generate a first W code estimate, and means for performing a second W code extraction using the corresponding generated P code a d a corresponding Y code from the second set of Y codes to generate a second W code estimate; means for correlating the first W code estimate and the second W code estimate to generate a correlation output; and means for generating an authentication decision for the satellite channel according to the correlation output.

At least paragraphs [0046], [0054], [0071]-[0073], FIG. 7, FIG. 8 and their corresponding descriptions provide means for combining the authentication decision from each of the satellite channel to generate an integrated authentication decision; means for comparing the integrated authentication decision to a predetermined global threshold to generate the authentication response; means for combining an authentication decision from each satellite channel as the authentication decision becomes available to generate an integrated authentication decision; and means for comparing the integrated authentication decision to a predetermined global threshold to generate the authentication response.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, communications between any of the mobile 304, server 306, and authentication consumer 308 may be over any of the networks described above. Further, communications between the mobile 504 and server 506 may be over any of the networks described above. The apparatus illustrated in FIG. 7 may be configured to communicate over any of the networks described above, or example using the antenna 702 and modem 704.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

I claim:

1. A method of authentication, comprising:
receiving a first set of Y codes from a plurality of satellites;
generating authentication decisions using W code estimates extracted from the first set of Y codes for satellite channels corresponding to the plurality of satellites, wherein generating authentication decisions further comprises receiving a second set of Y codes from the plurality of satellites via a mobile device; and generating the authentication decisions using the W code estimates extracted from the first set of Y codes and W code estimates extracted from the second set of Y codes for satellite channels corresponding to the plurality of satellites; and
generating an authentication response according to authentication decisions generated for the satellite channels.

2. The method of claim 1, wherein generating authentication decisions comprises:
generating a set of P codes corresponding to the plurality of satellites using the first set of Y codes; and
for each Y code associated with a satellite channel, performing a first W code extraction using a corresponding generated P code and a corresponding Y code from the first set of Y codes to generate a first W code estimate, and performing a second W code extraction using the corresponding generated P code and a corresponding Y code from the second set of Y codes to generate a second W code estimate; correlating the first W code estimate and the second W code estimate to generate a correlation output; and generating an authentication decision for the satellite channel according to the correlation output.

3. The method of claim 2, wherein generating an authentication response comprises:

combining the authentication decision from each satellite channel to generate an integrated authentication decision; and comparing the integrated authentication decision to a predetermined threshold to generate the authentication response.

4. The method of claim 3, wherein the predetermined threshold is determined based on at least one of:
a number of satellite channels used in determining the authentication response;
expected chip error rate of the first W code extraction and the second W code extraction; and
signal to noise ratio of the satellite channels.

5. The method of claim 1, further comprising transmitting the authentication response to a device requesting authentication of information from the mobile device.

6. The method of claim 1, wherein generating an authentication response further comprises:
combining an authentication decision from each of the satellite channels as the authentication decision becomes available to generate an integrated authentication decision; and
comparing the integrated authentication decision to a predetermined threshold to generate the authentication response.

7. The method of claim 1, wherein generating authentication decisions further comprises:
generating a set of P codes corresponding to the plurality of satellites using the first set of Y codes;
for each Y code associated with a satellite channel, performing a first W code extraction using a corresponding generated P code and a corresponding Y code from the first set of Y codes to generate a first W code estimate;
receiving a second W code estimate;
correlating the first W code estimate and the second W code estimate to generate a correlation output; and
generating an authentication decision according to the correlation output.

8. The method of claim 7, wherein generating an authentication response comprises:
combining the authentication decision from each satellite channel to generate an integrated authentication decision; and
comparing the integrated authentication decision to a predetermined threshold to generate the authentication response.

9. The method of claim 8, wherein the predetermined threshold is determined based on at least one of:
a number of satellite channels used in determining the authentication response;
expected chip error rate of the first W code extraction; and
signal to noise ratio of the satellite channels.

10. The method of claim 7, wherein the second W code estimate is received from a trusted server.

11. The method of claim 1, wherein the receiving comprises receiving a first Y code of the first set of Y codes over a first frequency and receiving a second Y code of the first set of Y codes over a second frequency, and wherein the method further comprises estimating at least one W code based on a combination of a W code as extracted from the first Y code and a W code as extracted from the second Y code.

12. The method of claim 1, wherein generating authentication decisions further comprises:
receiving inphase and quadrature (I/Q) samples of a signal; and generating the authentication decisions using the W code estimates extracted from the first set of Y codes and W code estimates extracted from the I/Q samples of the signal,
wherein the authentication decisions indicate whether a source of the signal is authentic.

13. An apparatus, comprising:
an authentication module including processing logic, the processing logic comprising:
a first set of W code extraction units that comprise logic configured to receive a first set of Y codes from a plurality of satellites;
logic configured to generate authentication decisions using W code estimates extracted from the first set of Y codes for satellite channels corresponding to the plurality of satellites, wherein the logic configured to generate authentication decisions further comprises a second set of W code extraction units that comprise logic configured to receive a second set of Y codes from the plurality of satellites via a mobile device; and a set of correlation units that comprise logic configured to generate the authentication decisions using the W code estimates extracted from the first set of Y codes and W code estimates extracted from the second set of Y codes for satellite channels corresponding to the plurality of satellites; and
an authentication unit that comprises logic configured to generate an authentication response according to the authentication decisions generated for the satellite channels.

14. The apparatus of claim 13, wherein logic configured to generate authentication decisions comprises:
generating a set of P codes corresponding to the plurality of satellites using the first set of Y codes; and
for each Y code associated with a satellite channel, logic configured to perform a first W code extraction using a corresponding generated P code and a corresponding Y code from the first set of Y codes to generate a first W code estimate, and logic configured to perform a second W code extraction using the corresponding generated P code and a corresponding Y code from the second set of Y codes to generate a second W code estimate; logic configured to correlate the first W code estimate and the second W code estimate to generate a correlation output; and logic configured to generate an authentication decision for the satellite channel according to the correlation output.

15. The apparatus of claim 14, wherein logic configured to generate an authentication response comprises:
logic configured to combine the authentication decision from each satellite channel to generate an integrated authentication decision; and
logic configured to compare the integrated authentication decision to a predetermined threshold to generate the authentication response.

16. The apparatus of claim 15, wherein the predetermined threshold is determined based on at least one of:
a number of satellite channels used in determining the authentication response;
expected chip error rate of the first W code extraction and the second W code extraction; and
signal to noise ratio of the satellite channels.

17. The apparatus of claim 13, further comprising logic configured to transmit the authentication response to a device requesting authentication of information from the mobile device.

18. The apparatus of claim 13, wherein logic configured to generate an authentication response further comprises:
   logic configured to combine an authentication decision from each of the satellite channels as the authentication decision becomes available to generate an integrated authentication decision; and
   logic configured to compare the integrated authentication decision to a predetermined threshold to generate the authentication response.

19. The apparatus of claim 13, wherein logic configured to generate authentication decisions further comprises:
   logic configured to generate a set of P codes corresponding to the plurality of satellites using the first set of Y codes;
   for each Y code associated with a satellite channel, logic configured to perform a first W code extraction using a corresponding generated P code and a corresponding Y code from the first set of Y codes to generate a first W code estimate;
   logic configured to receive a second W code estimate;
   logic configured to correlate the first W code estimate and the second W code estimate to generate a correlation output; and
   logic configured to generate an authentication decision according to the correlation output.

20. The apparatus of claim 19, wherein logic configured to generate an authentication response comprises:
   logic configured to combine the authentication decision from each satellite channel to generate an integrated authentication decision; and
   logic configured to compare the integrated authentication decision to a predetermined threshold to generate the authentication response.

21. The apparatus of claim 20, wherein the predetermined threshold is determined based on at least one of:
   a number of satellite channels used in determining the authentication response;
   expected chip error rate of the first W code extraction; and
   signal to noise ratio of the satellite channels.

22. The apparatus of claim 19, wherein the second W code estimate is received from a trusted server.

23. The apparatus of claim 13, wherein the logic configured to receive comprises logic configured to receive a first Y code of the first set of Y codes over a first frequency and logic configured to receive a second Y code of the first set of Y codes over a second frequency, and wherein the apparatus further comprises logic configured to estimate at least one W code based on a combination of a W code as extracted from the first Y code and a W code as extracted from the second Y code.

24. The apparatus of claim 13, wherein logic configured to generate authentication decisions further comprises:
   logic configured to receive inphase and quadrature (I/Q) samples of a signal; and
   logic configured to generate the authentication decisions using the W code estimates extracted from the first set of Y codes and W code estimates extracted from the I/Q samples of the signal,
   wherein the authentication decisions indicate whether a source of the signal is authentic.

25. A non-transitory medium storing instructions for execution by one or more computer systems, the instructions comprising:
   instructions for receiving a first set of Y codes from a plurality of satellites;
   instructions for generating authentication decisions using W code estimates extracted from the first set of Y codes for satellite channels corresponding to the plurality of satellites, wherein the instructions for generating authentication decisions further comprises instructions for receiving a second set of Y codes from the plurality of satellites via a mobile device; and instructions for generating the authentication decisions using the W code estimates extracted from the first set of Y codes and W code estimates extracted from the second set of Y codes for satellite channels corresponding to the plurality of satellites; and
   instructions for generating an authentication response according to authentication decisions generated for the satellite channels.

26. A system, comprising:
   means for receiving a first set of Y codes from a plurality of satellites;
   means for generating authentication decisions using W code estimates extracted from the first set of Y codes for satellite channels corresponding to the plurality of satellites, wherein the means for generating authentication decisions further comprises means for receiving a second set of Y codes from the plurality of satellites via a mobile device; and means for generating the authentication decisions using the W code estimates extracted from the first set of Y codes and W code estimates extracted from the second set of Y codes for satellite channels corresponding to the plurality of satellites; and
   means for generating an authentication response according to the authentication decisions generated for the satellite channels.

27. The system of claim 26, wherein means for generating authentication decisions comprises:
   means for generating a set of P codes corresponding to the plurality of satellites using the first set of Y codes; and
   for each Y code associated with a satellite channel, means for performing a first W code extraction using a corresponding generated P code and a corresponding Y code from the first set of Y codes to generate a first W code estimate, and means for performing a second W code extraction using the corresponding generated P code and a corresponding Y code from the second set of Y codes to generate a second W code estimate; means for correlating the first W code estimate and the second W code estimate to generate a correlation output; and means for generating an authentication decision for the satellite channel according to the correlation output.

28. The system of claim 27, wherein means for generating an authentication response comprises:
   means for combining the authentication decision from each satellite channel to generate an integrated authentication decision; and
   means for comparing the integrated authentication decision to a predetermined threshold to generate the authentication response.

29. The system of claim 28, wherein the predetermined threshold is determined based on at least one of:
   a number of satellite channels used in determining the authentication response;
   expected chip error rate of the first W code extraction and the second W code extraction; and
   signal to noise ratio of the satellite channels.

30. The system of claim 26, further comprising means for transmitting the authentication response to a device requesting authentication of information from the mobile device.

31. The system of claim 26, wherein means for generating an authentication response further comprises:

means for combining an authentication decision from each of the satellite channels as the authentication decision becomes available to generate an integrated authentication decision; and means for comparing the integrated authentication decision to a predetermined threshold to generate the authentication response.

32. The system of claim 26, wherein means for generating authentication decisions further comprises:

means for generating a set of P codes corresponding to the plurality of satellites using the first set of Y codes;

for each Y code associated with a satellite channel, means for performing a first W code extraction using a corresponding generated P code and a corresponding Y code from the first set of Y codes to generate a first W code estimate;

means for receiving a second W code estimate;

means for correlating the first W code estimate and the second W code estimate to generate a correlation output; and means for generating an authentication decision according to the correlation output.

33. The system of claim 32, wherein means for generating an authentication response comprises:

means for combining the authentication decision from each satellite channel to generate an integrated authentication decision; and means for comparing the integrated authentication decision to a predetermined threshold to generate the authentication response.

34. The system of claim 33, wherein the predetermined threshold is determined based on at least one of:

a number of satellite channels used in determining the authentication response;

expected chip error rate of the first W code extraction; and signal to noise ratio of the satellite channels.

35. The system of claim 32, wherein the second W code estimate is received from a trusted server.

36. The system of claim 26, wherein the means for receiving comprises means for receiving a first Y code of the first set of Y codes over a first frequency and means for receiving a second Y code of the first set of Y codes over a second frequency, and wherein the system further comprises means for estimating at least one W code based on a combination of a W code as extracted from the first Y code and a W code as extracted from the second Y code.

37. The system of claim 26, wherein means for generating authentication decisions further comprises:

means for receiving inphase and quadrature (I/Q) samples of a signal; and means for generating the authentication decisions using the W code estimates extracted from the first set of Y codes and W code estimates extracted from the I/Q samples of the signal, wherein the authentication decisions indicate whether a source of the signal is authentic.

* * * * *